(12) United States Patent
Douthitt et al.

(10) Patent No.: US 8,311,584 B2
(45) Date of Patent: Nov. 13, 2012

(54) HANDS-FREE SYSTEM AND METHOD FOR RETRIEVING AND PROCESSING PHONEBOOK INFORMATION FROM A WIRELESS PHONE IN A VEHICLE

(75) Inventors: Brian L. Douthitt, Holland, MI (US);
Steven G. Schultz, Holland, MI (US);
Ted W. Ringold, Hudsonville, MI (US);
Jeffrey N. Golden, Holland, MI (US);
Mark L. Zeinstra, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 352 days.

(21) Appl. No.: 11/813,499

(22) PCT Filed: Jan. 6, 2006

(86) PCT No.: PCT/US2006/000424
§ 371 (c)(1),
(2), (4) Date: Sep. 12, 2008

(87) PCT Pub. No.: WO2006/074345
PCT Pub. Date: Jul. 13, 2006

(65) Prior Publication Data
US 2009/0011799 A1    Jan. 8, 2009

(51) Int. Cl.
*H04B 1/38* (2006.01)
(52) U.S. Cl. .......... 455/563; 455/569.2; 455/575.9; 704/246
(58) Field of Classification Search .......... 455/563, 455/564, 569.1, 569.2, 575.9, 550.1, 418–420, 455/556.1–556.2; 704/231, 275, 246, E13.001; 701/1
See application file for complete search history.

(56) References Cited

U.S. PATENT DOCUMENTS

| | | | |
|---|---|---|---|
| 4,827,520 A | 5/1989 | Zeinstra | |
| 5,113,182 A | 5/1992 | Suman et al. | |
| 5,278,547 A | 1/1994 | Suman et al. | |
| 5,475,366 A | 12/1995 | Van Lente et al. | |
| 5,479,155 A | 12/1995 | Zeinstra et al. | |

(Continued)

FOREIGN PATENT DOCUMENTS

CN    1426914 A    7/2003
(Continued)

OTHER PUBLICATIONS

International Search Report and Written Opinion for PCT/US2006/000424 mailed May 22, 2006, 10 pages.

(Continued)

*Primary Examiner* — Sharad Rampuria
(74) *Attorney, Agent, or Firm* — Foley & Lardner LLP (57) ABSTRACT

A method is provided for creating a phonebook for a hands-free telephone system in a vehicle using phonebook entries retrieved from a remote phonebook of a mobile phone over a wireless communication link between a control module of the hands-free telephone system and the mobile phone. The method includes receiving a remote phonebook from the mobile phone, the remote phonebook including a plurality of entries, each entry including text data and numeric data, identifying the text data in each entry, generating an acoustic baseform for each entry based on the text data for each entry, storing the acoustic baseform for each entry in a baseform list, and storing the plurality of entries in a mobile phonebook associated with the baseform list.

20 Claims, 6 Drawing Sheets

U.S. PATENT DOCUMENTS

| | | | |
|---|---|---|---|
| 5,479,157 A | 12/1995 | Suman et al. | |
| 5,583,485 A | 12/1996 | Van Lente et al. | |
| 5,584,052 A * | 12/1996 | Gulau et al. | 455/79 |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,455 A | 8/1997 | Van Lente et al. | |
| 5,691,848 A | 11/1997 | Van Lente et al. | |
| 5,699,044 A | 12/1997 | Van Lente et al. | |
| 5,708,415 A | 1/1998 | Van Lente et al. | |
| 5,717,387 A | 2/1998 | Suman et al. | |
| 5,854,593 A | 12/1998 | Dykema et al. | |
| 5,903,226 A | 5/1999 | Suman et al. | |
| 5,926,087 A | 7/1999 | Busch et al. | |
| 6,154,148 A | 11/2000 | Fluharty et al. | |
| 6,336,038 B1 | 1/2002 | Nojima et al. | |
| 6,690,954 B2 * | 2/2004 | Ushida | 455/563 |
| 7,050,834 B2 | 5/2006 | Harwood et al. | |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,363,061 B2 * | 4/2008 | Kakehi | 455/569.2 |
| 7,596,370 B2 * | 9/2009 | Chengalvarayan et al. | 455/418 |
| 7,787,907 B2 * | 8/2010 | Zeinstra et al. | 455/563 |
| 7,941,481 B1 * | 5/2011 | Partovi et al. | 709/203 |
| 8,108,010 B2 * | 1/2012 | Miyake | 455/569.2 |
| 8,112,125 B2 * | 2/2012 | Bailey, II | 455/569.1 |
| 2002/0091706 A1 | 7/2002 | Anderson et al. | |
| 2003/0114202 A1 | 6/2003 | Suh et al. | |
| 2003/0147518 A1 * | 8/2003 | Albal et al. | 379/207.15 |
| 2004/0022137 A1 | 2/2004 | Campbell et al. | |
| 2004/0110472 A1 | 6/2004 | Witkowski et al. | |
| 2004/0203379 A1 | 10/2004 | Witkowski et al. | |
| 2004/0240633 A1 | 12/2004 | Sloan | |
| 2005/0041793 A1 * | 2/2005 | Fulton et al. | 379/211.01 |
| 2005/0090279 A9 | 4/2005 | Witkowski et al. | |
| 2005/0143134 A1 * | 6/2005 | Harwood et al. | 455/563 |
| 2005/0154587 A1 * | 7/2005 | Funari et al. | 704/247 |
| 2006/0168627 A1 | 7/2006 | Zeinstra et al. | |
| 2008/0085745 A1 * | 4/2008 | Ozaki | 455/569.2 |
| 2010/0062809 A1 * | 3/2010 | Luk | 455/564 |
| 2010/0112988 A1 * | 5/2010 | Tamura | 455/414.1 |
| 2010/0197362 A1 * | 8/2010 | Saitoh et al. | 455/569.2 |
| 2011/0276330 A1 * | 11/2011 | Charlier et al. | 704/246 |

FOREIGN PATENT DOCUMENTS

| | | |
|---|---|---|
| EP | 1 263 146 A2 | 12/2002 |
| EP | 1263146 | 12/2002 |
| FR | 2 819 358 A1 | 7/2002 |
| FR | 2819358 | 7/2002 |
| JP | 10-215307 | 8/1998 |
| JP | 11-027363 A | 1/1999 |
| JP | 11-136352 A | 5/1999 |
| JP | 11-261706 A | 9/1999 |
| JP | 2001-211245 A | 8/2001 |
| JP | 2001-230848 A | 8/2001 |
| JP | 2002-057781 | 2/2002 |
| JP | 2002-237877 | 8/2002 |
| JP | 2003-069709 | 3/2003 |
| WO | WO 2006/074345 A1 | 7/2006 |

OTHER PUBLICATIONS

European Office Action for EP 06717599.2, dated Nov. 8, 2010, 5 pages.

Unofficial Translation of Japanese Office Action for JP2007-550487, dated May 17, 2011, 2 pages.

Japanese Office Action for JP2007-550487, dated May 17, 2011, 2 pages.

English Translation of Japanese Final Notice of Reasons for Rejection dated Jan. 24, 2012 as received in corresponding Japanese Application No. 2007-550487.

* cited by examiner

HANDS-FREE SYSTEM AND METHOD FOR RETRIEVING AND PROCESSING PHONEBOOK INFORMATION FROM A WIRELESS PHONE IN A VEHICLE

FIELD

The present invention relates generally to the field of wireless communication with a vehicle and in particular, a system and method for retrieving and processing phonebook information from a wireless phone using a hands-free telephone system in the vehicle.

BACKGROUND

Vehicles typically include a number of electronic systems such as an audio system (e.g., a radio, speakers, CD player, MP3 player), a clock, a hands-free telephone system, a navigation system, etc. A hands-free telephone system may include a microphone and one or more speakers, which may be integrally mounted in the vehicle. The microphone and speakers may be configured as a component of the vehicle audio system. Hands-free telephone systems have been developed that provide for communication between a vehicle occupant and the occupant's personal mobile telephone, which is located within the vicinity of the vehicle (e.g., in a cradle, in the occupant's pocket or briefcase, etc.). A hands-free telephone system may include a control module configured to receive audio signals via the microphone, in order to provide audio signals from the microphone to the wireless phone and to provide audio signals received from the wireless phone to the speakers in the vehicle. The wireless phone may be connected to the hands-free telephone system (e.g., the control module) by a wireless communication link using a short-range wireless technology such as a BLUETOOTH communications protocol, an IEEE 802.11 communications protocol, etc.

A hands-free telephone system is typically configured to include a phonebook having one or more names and phone numbers stored therein for a user to access when operating the hands-free telephone system. A user's wireless telephone typically is also configured to include a phonebook of names and phone numbers stored in memory. The phonebook entries in the user's wireless phone may be updated from time to time, in order to add new entries or update existing entries. Typically, however, the phonebook information of the hands-free telephone system must be updated separately from the phonebook information in the user's personal wireless phone. Accordingly, the phonebook information in the user's wireless phone may be different from the phonebook information stored in the memory of the hands-free telephone system. Additionally, a user may not be able to access and utilize the phonebook information in the user's personal wireless phone for speech-enabled, hands free dialing via the hands-free telephone system in the vehicle.

It would be advantageous to provide a hands-free telephone system in a vehicle that is configured to: 1) retrieve phonebook information from a first wireless phone upon receiving a command from a user; 2) automatically retrieve phonebook information from a first wireless phone upon establishing a wireless communications link with the wireless phone; 3) generate and/or update a mobile phonebook in the hands-free telephone system based on the phonebook information from a wireless phone, including converting the information to acoustic baseforms so that a user may access and manipulate the mobile phonebook via voice commands and speech recognition; 4) audibly list the entries of the mobile phonebook based on an audible command of the user; and 5) generate a mobile phonebook in the hands-free telephone system using the phonebook information from a second wireless phone, by overwriting the current mobile phonebook entries in the hands-free telephone system, thereby allowing the mobile phonebook to include the phonebook information from the current wireless phone connected to the hands-free telephone system.

SUMMARY

In accordance with one embodiment, a method for creating a phonebook for a hands-free telephone system in a vehicle using phonebook entries retrieved from a remote phonebook of a wireless phone over a wireless communication link between a control module of the hands-free telephone system and the wireless phone includes receiving a remote phonebook from the wireless phone, the remote phonebook including a plurality of entries, each entry including text data and numeric data, identifying the text data in each entry, generating an acoustic baseform for each entry based on the text data for each entry, storing the acoustic baseform for each entry in a baseform list, and storing the plurality of entries in a mobile phonebook associated with the baseform list.

In accordance with another embodiment, a hands-free telephone system in a vehicle for retrieving phonebook entries from a wireless phone over a communication link includes a communication module for establishing a wireless communication link with the wireless phone. The communication module may be configured to receive a plurality of entries of a remote phonebook from the wireless phone such that each of the entries includes text data and numeric data. The system also includes a data processing module coupled to the communication module. The data processing module may be configured to identify the text data of each entry and generate a phonemic representation of the text data of each entry. The system further includes a memory module configured to store the plurality of entries received from the remote phonebook and the phonemic representation of the text data of each of the plurality of entries.

BRIEF DESCRIPTION OF THE DRAWINGS

The invention will be more readily understood by reference to the following description taken with the accompanying drawings, in which.

DETAILED DESCRIPTION

Figure 1:
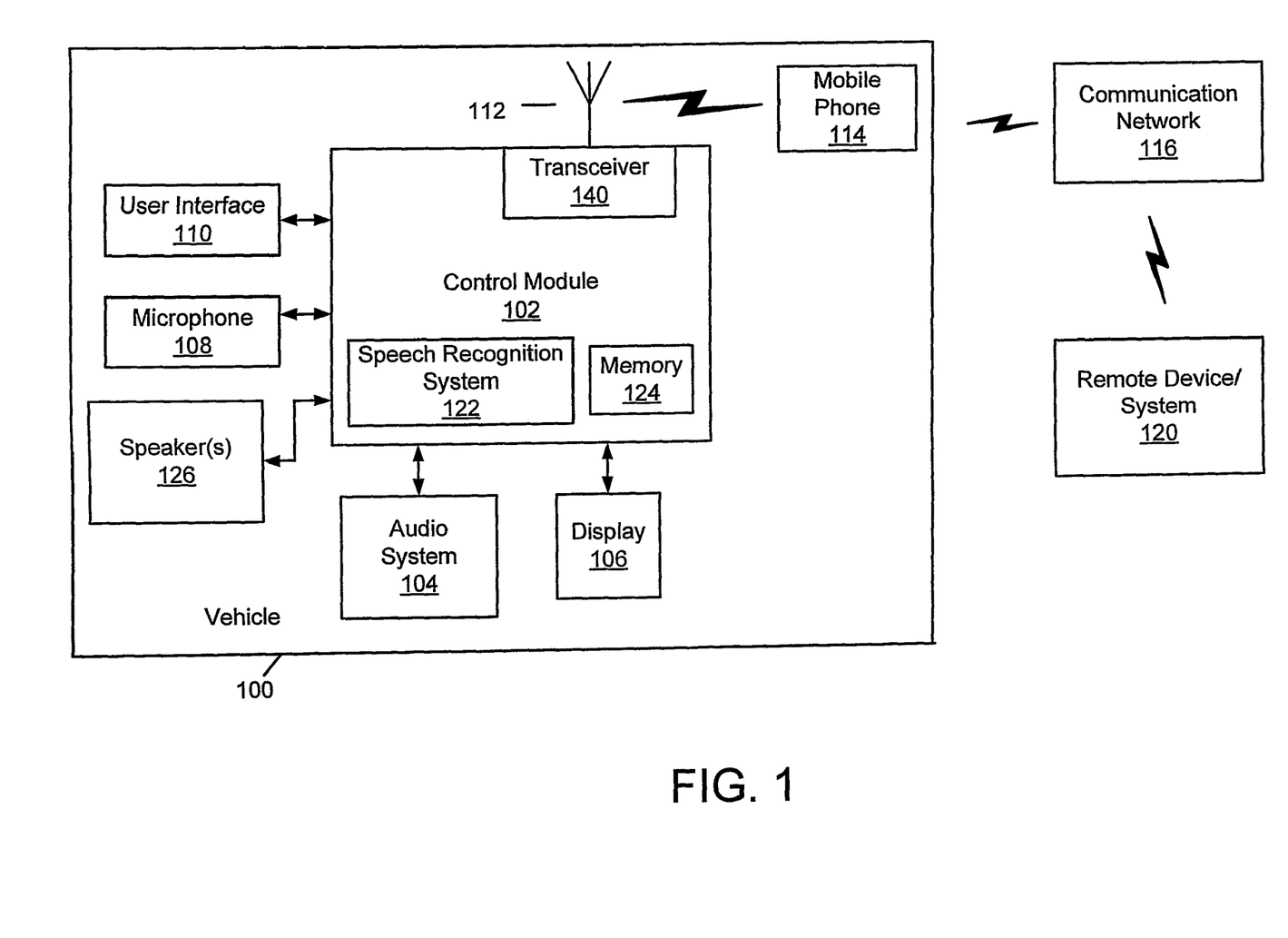
FIG. 1 is a block diagram of a hands-free telephone system in a vehicle in accordance with an exemplary embodiment.

FIG. 1 is a block diagram of a hands-free telephone system in a vehicle in accordance with an exemplary embodiment.

The hands-free telephone system enables a vehicle occupant, such as a driver, to use the occupant's personal wireless phone 114 to make a hands-free call to a remote device or system 120 (e.g., a wireless phone, a phone coupled to a land line, a remote server, etc.) via a communications network 116 without holding wireless phone 114 to the occupant's ear or using a headphone or ear phone. Other vehicle occupants (e.g., passengers) may also use the system to make hands-free calls using their personal wireless phone 114. The exemplary system shown in FIG. 1 enables a wireless communication link to be established between an audio system 104 of vehicle 100 and a wireless phone 114 (e.g., a cellular phone, a PCS-based phone or other mobile telephone system) of a vehicle occupant. Alternatively, a hands-free telephone system may be provided that includes a wired connection to a vehicle occupant's personal wireless phone 114. The wired connection may include a cradle for wireless phone 114 or a similar wired adapter. The following description will refer to an exemplary hands-free telephone system using a wireless communication link between the vehicle audio system and wireless phone 114 of a vehicle occupant, however, it should be understood that methods and systems for retrieving and processing phonebook information from a wireless phone described herein may be used in conjunction with other configurations of hands-free telephone systems, such as a wired connection to a vehicle occupant's wireless phone, etc.

In FIG. 1, the hands-free telephone system in vehicle 100 includes a control module 102 coupled to the audio system 104 and an antenna 112. In an alternative embodiment, control module 102 may be incorporated into audio system 104. Antenna 112, in conjunction with a transceiver 140 in control module 102, enables two-way communication with wireless phone 114. Transceiver 140 may be configured as a communication circuit including analog and/or digital components, such that transceiver 140 is capable of transmitting and receiving short-range radio frequency ("RF") signals in any of a variety of data transmission formats, such as a BLUETOOTH communications protocol, an IEEE 802.11 communications protocol or other personal area network wireless communications protocols or data formats. Wireless phone 114 may include a plurality of transceiver circuits, for example, a BLUETOOTH transceiver circuit configured to communicate with transceiver 140 and a cellular transceiver circuit using a cellular communications format (e.g., CDMA, TDMA, etc.) configured to communicate with a communication network 116 (e.g., a wireless communications network such as a cellular communication network).

Control module 102 is also coupled to a user interface 110 and a microphone 108. User interface 110 may be used to receive input commands from a vehicle occupant via, for example, pushbuttons, switches, a keypad, a touch screen display, etc. Alternatively, input commands to control module 102 may include a set of audio signals from a vehicle occupant. For example, a vehicle occupant may speak directly into the microphone 108 to provide input commands to the control module 102. Microphone 108 may include one or more microphones configured to receive an oral command from a vehicle occupant. The oral command may be any word or phrase that the occupant may speak, utter, or otherwise provide to cause the hands-free telephone system or another system to perform a function. A speech recognition system (or data processing module) 122 in control module 102 may be used to process various data signals, such as audio signals (e.g., oral input commands) received via microphone 108 and to recognize words or phrases in the oral command. Voice recognition technologies known in the art may be implemented in speech recognition system 122. For example, speech recognition system 122 may comprise any speech recognition software or engine such as IBM Embedded ViaVoice®, manufactured by International Business Machines Corporation.

Control module 102 may also be coupled to a display 106. Display 106 may comprise a small cathode ray tube (CRT), liquid crystal display (LCD), or various other types of visual displays which are easily visible in various lighting conditions. Control module 102 may comprise one or more analog and/or digital electrical or electronic components, and may include a microprocessor, a microcontroller, application-specific integrated circuit (ASIC), programmable logic and/or other analog and/or digital circuit elements configured to perform various input/output, control, analysis and other functions described herein. Control module 102 may also include memory 124, including volatile and non-volatile memory in order to, for example, store a computer program or other software to perform the functions described herein. Each element in vehicle 100 shown in FIG. 1 may be mounted in or coupled to the same or different interior vehicle elements such as a dashboard, an overhead console, an instrument panel, a visor, a rearview mirror, or other appropriate locations within the vehicle. Preferably, user interface 110, microphone 108 and display 106 are mounted in a location convenient to the vehicle occupants, in particular, the driver.

Audio system 104 may include, for example, a radio, an amplifier and at least one speaker configured to provide audio signals to one or more vehicle occupants. The speakers (not shown) are configured to receive audio output data from control module 102 and/or other systems (e.g., an audible communication from another party to a telephone call, information prompts or other messages provided by control module 102, etc.). The speakers may be a part of the vehicle audio system 104 or may be a dedicated speaker or speakers 126 serving only control module 102.

As mentioned above, in the exemplary system shown in FIG. 1, control module 102 is linked via a wireless communications link with a wireless phone 114 of a vehicle occupant. A communication link may be established with different wireless phones as different occupants are enabled to use the hands-free telephone system. A communication link may be established, for example, in response to a command received from the user via user interface 110 or an oral command received via microphone 108. The wireless communication link operates in accordance with a wireless communication standard, such as BLUETOOTH communication protocol, IEEE 802.11 communication protocol, a Shared Wireless Access Protocol-Cordless Access (SWAP-CA) protocol, etc. Accordingly, wireless phone 114 is enabled to operate in accordance with or to communicate with the wireless communications standard used for the wireless communication link.

The communication link between control module 102 and wireless phone 114 enables hands-free use of a vehicle occupant's personal wireless phone 114 including both outgoing and incoming calls. For example, a user may dial a number on wireless phone 114 to place a call and the conversation thereafter can be conducted via microphone 108 and audio system 104. Alternatively, a call could be placed via commands and numbers spoken into microphone 108 and transmitted via the wireless communications link to the wireless phone 114. For example, a phone number may be dialed hands-free by receiving an oral command from a vehicle occupant and sending the dial command and phone number to wireless phone 114 via the wireless communication link. Voice data from a vehicle occupant during a phone call is provided to wireless phone 114 via the wireless communication link for transmission to communication network 116 and remote device 120. In addition, voice data and other information from a remote device or system 120 may be received by control module 102 via a wireless phone 114 over the wireless communication link. Audio information received by control module 102 may be provided to the user via audio system 104 (e.g., via speakers, not shown) and data received from the wireless phone 114 may be displayed on display 106. Wireless phone 114 may be located anywhere within the proximity of vehicle 100, such as in an occupant's pocket or briefcase, in the trunk or within a range of communication with transceiver 140.

For an outgoing call, audio signals received via microphone 108 are processed by control module 102 and sent to wireless phone 114 in the proper data format, for example, in accordance with the BLUETOOTH communication standard. Wireless phone 114 converts the signals received from control module 102 to the appropriate technology of the wireless service provider associated with the vehicle occupant's wireless phone 114 (e.g., Analog, CDMA, TDMA, GSM, etc.). The converted signal is then sent by wireless phone 114 to a communication network (e.g., cellular tower(s)) for transmission to the desired remote device or system 120. For example, a cellular tower may receive a signal from wireless phone 114, convert the signal to a "land line" signal and send the signal through a switching system to the landline telephone being called. Typically, at various stages in the communication process the signal is monitored and processed in order to, for example, reduce noise, echo, etc. For example, control module 102 may process the signal received from microphone 108 to reduce the noise emission from the vehicle.

Figure 2:
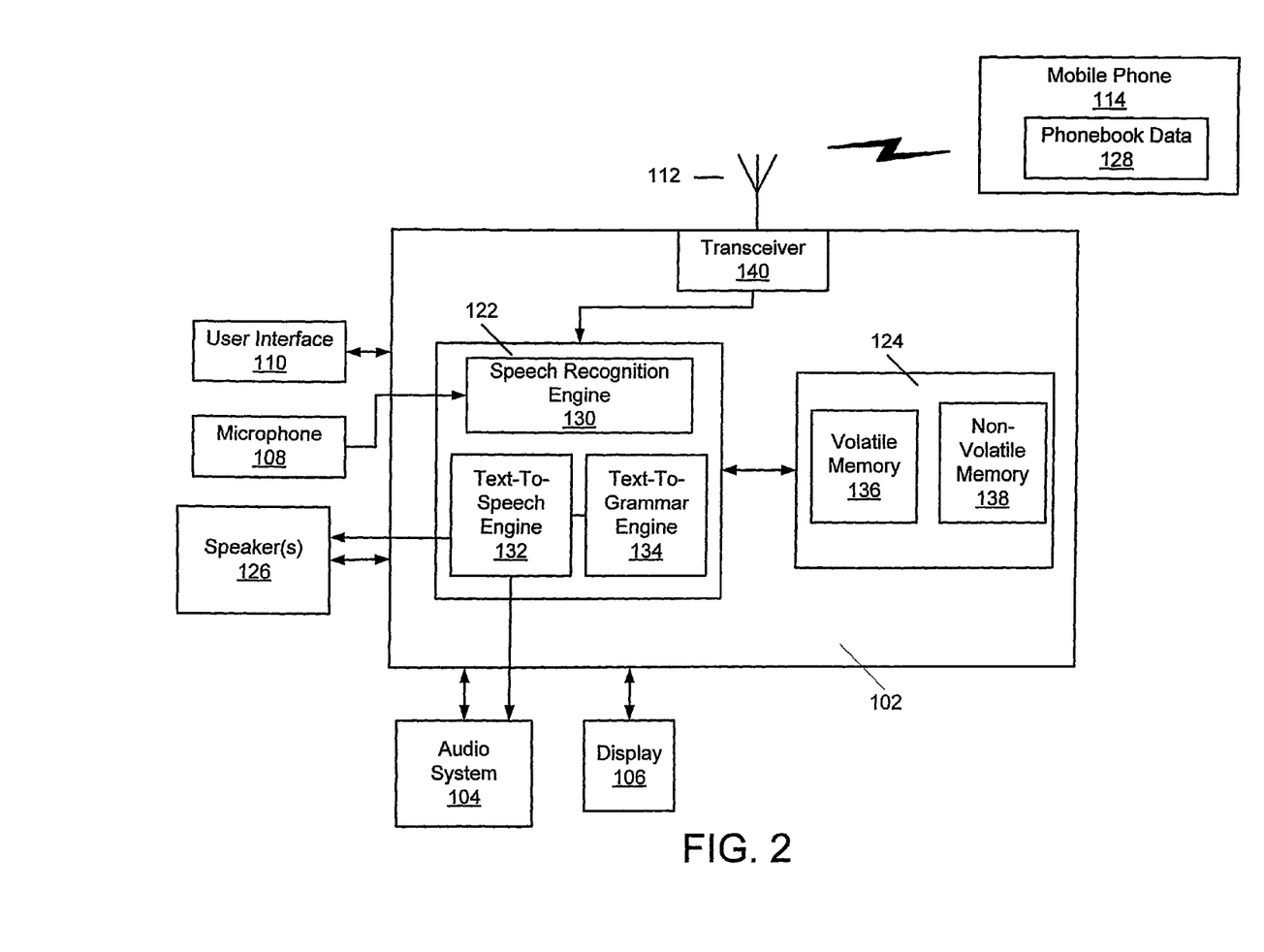
FIG. 2 is a block diagram of a system for retrieving and processing phonebook information from a wireless phone including the control module of FIG. 1 in accordance with an embodiment.

FIG. 2 is a block diagram of a system for retrieving and processing phonebook information from a wireless phone including the control module of FIG. 1. Memory 124 includes volatile memory 136 and non-volatile memory 138 for storing computer or software programs to perform functions of control module 102. For example, memory 124 includes a predetermined vocabulary of command words that may be recognized by speech recognition engine 130 of speech recognition system 122. The predetermined vocabulary may be used to manipulate systems and applications in the vehicle, in order to perform a function. Speech recognition engine 130 is configured to recognize words or phrases in an oral command and to compare the recognized word to the predetermined vocabulary of command words, in order to determine an appropriate action and/or the appropriate system or application to which an instruction should be delivered. Speech recognition system 122 also includes a text-to-speech engine 132 and a text-to-grammar engine 134. Text-to-speech engine 132 is configured to convert text (e.g., ASCII text) to an audio representation (e.g., PCM) that may be played through speakers 126 or audio system 104. Text-to-grammar engine 134 is configured to convert text (e.g., ASCII text) to a phonemic representation that may be used by speech recognition engine 130 to recognize words or text in an oral command from a user. Text-to-speech engine 132 and text-to-grammar engine 134 may be part of the same application or different applications. Text-to-speech and text-to-grammar technologies known in the art may be used such as Embedded ViaVoice® Text-To-Speech engine and Text-To-Grammar engine, manufactured by International Business Machines Corporation.

Memory 124 may also be used to store a system phonebook (e.g., names and telephone number entries) for use by a user during operation of the hands-free telephone system. As used herein, the term "system phonebook" means a phonebook resident in memory of control module 102 of the hands-free telephone system in the vehicle. The system phonebook may include a plurality of entries and may be accessed by a plurality of users. Each entry may include a number of fields to represent each contact in the system phonebook, such as name (e.g., John Smith), number (e.g., telephone number), location identifier (e.g., home, work, mobile, pager), etc. In one embodiment, a single entry may include up to four numbers for the contact associated with the entry such as a home number, a work number, a mobile number and a pager number. Alternatively, an entry may include only one number. Wireless phone 114 may also include phonebook data. In FIG. 2, wireless phone 114 include phonebook data 128, such as names, telephone numbers, etc., stored in, for example, memory (not shown) of wireless phone 114. A user may utilize known methods to add, edit, and otherwise manipulate phonebook entries in wireless phone 114. As used herein, the term "remote phonebook" means the phonebook data resident on wireless phone 114. The remote phonebook may include a plurality of entries. Each entry may include a number of fields such as name (e.g., John Smith), number (e.g., telephone number), location (e.g., home, work, mobile, pager), etc. As mentioned, control module 102 includes a system phonebook stored in memory 124. Preferably, the system phonebook is stored in non-volatile memory 138 (e.g., flash EPROM) and is, therefore, maintained across power cycles of the hands-free telephone system. A user may add, edit or otherwise manipulate phonebook entries in the system phonebook using user interface 110 or by voice commands via microphone 108 and speech recognition engine 130. Preferably a user provides a voice tag (e.g., a name such as "Joe Smith") for each entry in the system phonebook to facilitate speech recognition via speech recognition engine 130 and speech-enabled dialing. The voice tags may be stored in a voice tag list that is associated with the system phonebook entries.

Control module 102 is configured to retrieve phonebook data 128 from wireless phone 114 and to create a mobile phonebook for the hands-free telephone system. As used herein, the term "mobile phonebook" means a phonebook resident in control module 102 including phonebook data (e.g., phonebook entries) from a remote phonebook. In one embodiment, the phonebook data 128 (or remote phonebook) is retrieved automatically by control module 102 when a wireless communications link is established between control module 102 and wireless phone 114. In one embodiment, phonebook data 128 retrieved from wireless phone 114 may be stored as a mobile phonebook in volatile memory 136 (e.g., DRAM). Accordingly, the mobile phonebook is not preserved across power cycles of the hands-free telephone system. In an alternative embodiment, the mobile phonebook may be stored in non-volatile memory 138 (shown in FIG. 2) and may be maintained across power cycles and available to a user after power-on initialization. When a second wireless communications link is established with a different wireless phone (e.g., the wireless phone of another vehicle occupant), the data in the mobile phonebook may be overwritten with the phonebook data from the second wireless phone. Alternatively, each user may have a mobile phonebook with entries from their associated wireless phone stored in non-volatile memory. In this embodiment, the mobile phonebook for a particular user would only be accessible when the user's wireless phone 114 is connected to the hands-free telephone system via the wireless communications link.

Figure 3:
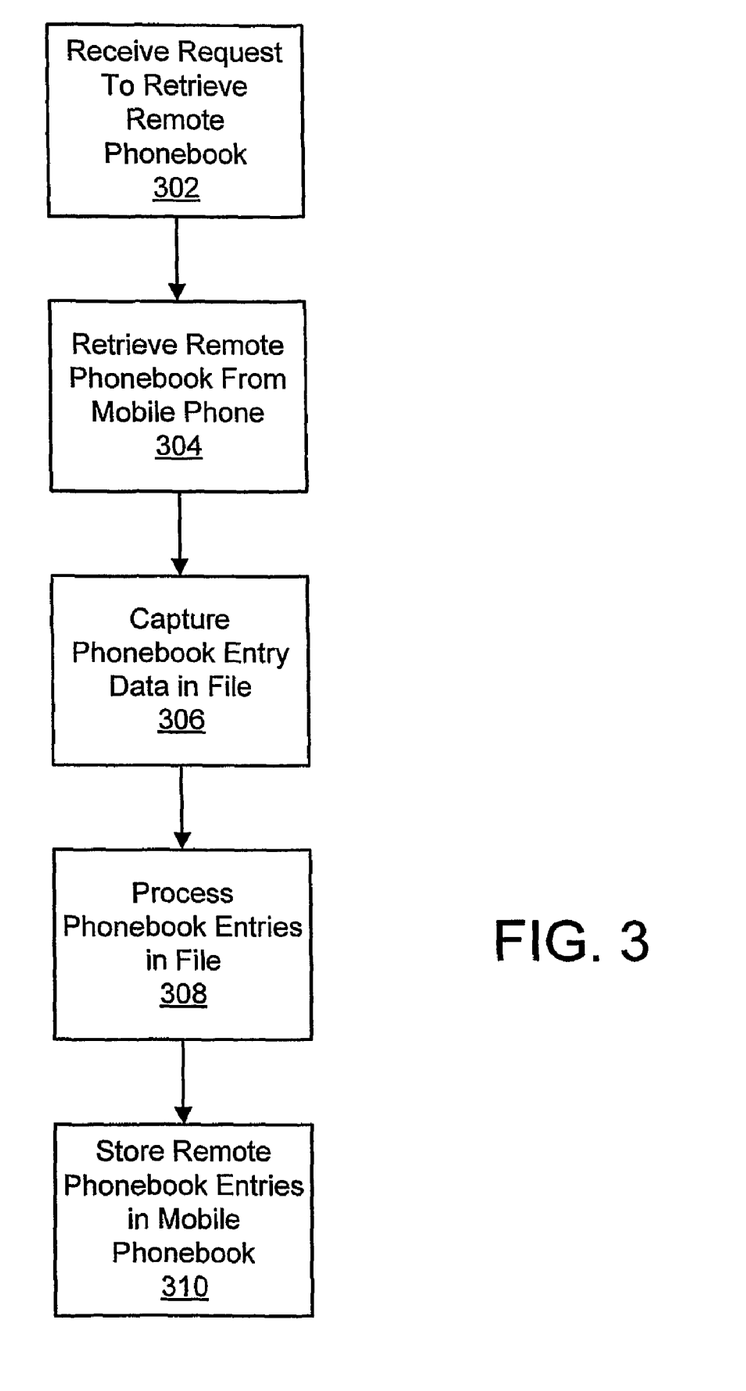
FIG. 3 illustrates a method for retrieving phonebook data from a remote phonebook in response to a user command in accordance with an embodiment.

Alternatively, phonebook data 128 (e.g., phonebook entries) from a remote phonebook of wireless phone 114 is retrieved in response to a command from a user in the vehicle. The command may be received via a user interface 110 (e.g., a button or switch) or as an oral command via microphone 108. FIG. 3 illustrates a method for retrieving phonebook data from a remote phonebook in response to a user command in accordance with an embodiment. After a wireless communications link is established between control module 102 and wireless phone 114, a user may provide a command to retrieve a remote phonebook from the wireless phone. At step 302, control module 102 (shown in FIG. 2) receives a command from a user to retrieve a remote phonebook from the connected wireless phone. As mentioned, a user may provide a request via user interface 110 (FIG. 2), for example, using a button or switch. Alternatively, the user may provide an oral command to request retrieval of the remote phonebook. At step 304, control module 102 sends a request to the wireless phone 114 via the wireless communications link and retrieves the phonebook data from the wireless phone 114. Once the phonebook data (e.g., a plurality of entries) is transferred to control module 102, the data is captured in a file at step 306 before creating the mobile phonebook. The retrieved phonebook entries are then processed at step 308 before being stored in a mobile phonebook. The processing of the phonebook entries from the remote phonebook is discussed in more detail below with respect to FIG. 4. After processing, the remote phonebook entries are stored in memory 124 (shown in FIG. 2) as a mobile phonebook. As mentioned previously, the mobile phonebook may be stored in volatile memory 136 (shown in FIG. 2). Accordingly, the mobile phonebook is not preserved across power cycles of the hands-free telephone system. Alternatively, the mobile phonebook may be stored in non-volatile memory 138 (shown in FIG. 2) and may be maintained across power cycles and available to a user after power-on initialization. As mentioned above, when a wireless communications link is established with a different wireless phone (e.g., the wireless phone of another vehicle occupant), the data in the mobile phonebook is overwritten with the phonebook data from the new wireless phone. Appendix A, below, includes two examples of use cases for retrieving a remote phonebook where the control module and the wireless phone are configured to communicate in accordance with the BLUETOOTH protocol.

Figure 4:
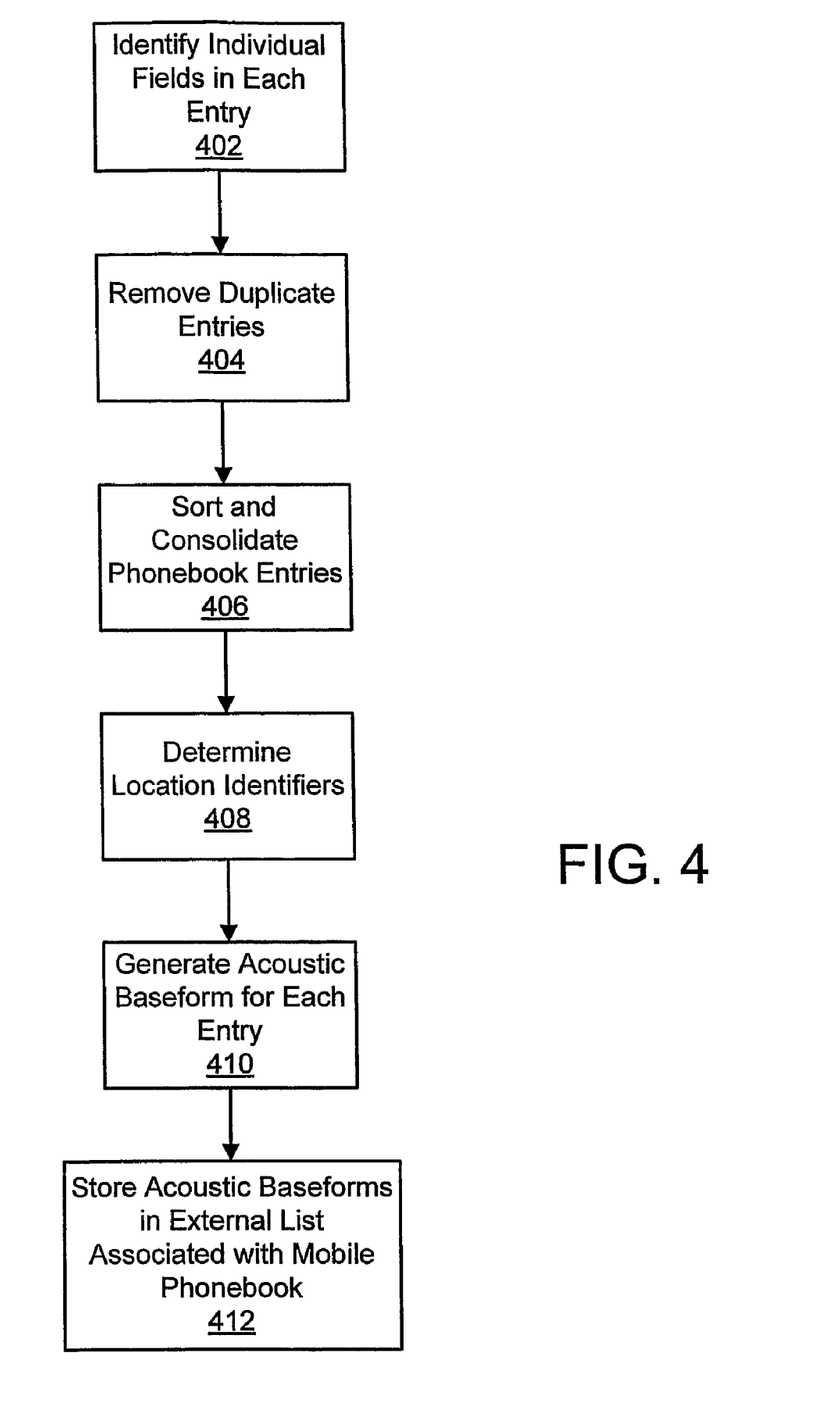
FIG. 4 illustrates a method for processing phonebook data from a remote phonebook and creating a mobile phonebook in accordance with an embodiment.

FIG. 4 illustrates a method for processing phonebook data from a remote phonebook and creating a mobile phonebook in accordance with an embodiment. At step 402, control module 102 (shown in FIG. 2) accesses the file where the retrieved remote phonebook entries are stored and identifies the individual fields in each entry such as name (i.e., a text string), number, the number's location identifier (e.g., home, work, mobile, pager). At step 404, control module 102 processes the phonebook data, for example, each name and its associated phone numbers to remove any duplicate entries where the text and/or phone numbers are identical to other entries in the phonebook data. For example, an entry may match another entry when the case insensitive text of the name field in two entries is identical, for example, "JOE SMITH" matches "Joe Smith" which also matches "joe smith." The phonebook entries may also be sorted alpha-numerically and consolidated so that all entries of the same person (i.e., where the text of the entries is identical but the phone numbers are different) are in a single entry at step 406. In addition, control module 102 may use a predefined set of rules to determine a number's location identifier (e.g., home, work, mobile, pager) in the text of an entry that may be associated with one or more phone numbers in the entry. For example, a character sequence embedded in the text of an entry may be interpreted as a location identifier when the sequence consists of a special character (e.g., @, /, \) followed by one or more alphabetic characters.

An acoustic baseform may be generated for the name string (i.e., the text of the entry excluding location identifiers) or the name string and location identifier of each entry using text-to-grammar engine 134, (shown in FIG. 2). The acoustic baseform is a phonemic representation that may be used by the speech recognition engine 130 (shown in FIG. 2) to recognize a user's utterance and, therefore, allow speech recognition to be performed against the entry of the mobile phonebook. An acoustic baseform is generated for the name string (or name string and location identifier) of each phonebook entry. Such location identifiers may be excluded from the text of the entry used to generate an acoustic baseform at step 410. Alternatively, an acoustic baseform may also be generated for the location identifier in order to create and recognize a more descriptive command (e.g., "call John Smith at work"). At step 412, the acoustic baseforms are stored in a baseform list that is associated with the mobile phonebook. Accordingly, speech recognition may be performed against the mobile phonebook entries and a user may use the mobile phonebook for hands-free dialing of the hands-free telephone system. Returning to FIG. 3, once the mobile phonebook is created in step 310, the mobile phonebook entries are available to a user for speech-enabled browsing and calling (or dialing). Control module 102 is also configured to allow a user to transfer and store mobile phonebook entries to the system phonebook.

Figure 5:
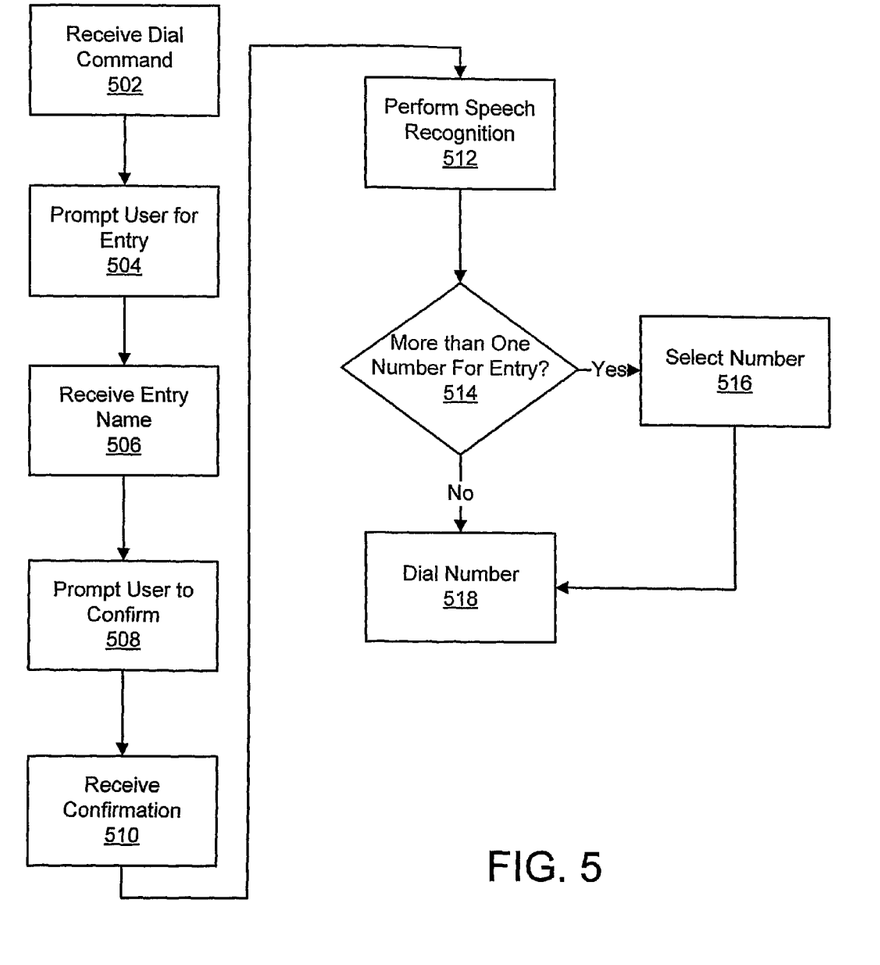
FIG. 5 illustrates a method for speech-enabled dialing using a mobile phonebook in accordance with an embodiment.

As mentioned, a user may originate or dial a call using an entry in the mobile phonebook. FIG. 5 illustrates a method for speech-enabled dialing using a mobile phonebook in accordance with an embodiment. At step 502, a control module 102 (shown in FIG. 2) receives a command to initiate a phone call from a user via microphone 108. In one embodiment, control module 102 prompts the user to provide an entry name at step 504. The prompt may be played via speakers 126 or the audio system 104. Alternatively, the user may provide (i.e., utter) the entry name with an oral command to initiate a call (e.g., "call <entry name>"). After the system receives the entry name at step 506, the system prompts the user to confirm the entry at step 508. After confirmation is received at step 510, a speech recognition engine processes the command against the mobile phonebook entries and system phonebook entries and identifies the desired mobile phonebook entry at step 512. If there are similar entries in the system phonebook and the mobile phonebook, the speech recognition engine selects the best match. At step 514, the speech recognition engine determines if there is more than one number associate with the desired entry (e.g., the entry includes a home number and a work number). In the event that there is more than one number associated with the entry, the control module 102 will list (via an audible prompt) the numbers in the entry. Text-to-speech engine 132 may be used to convert the numbers to audio output. The user may then select a number at step 516. Once a number has been determined, the control module 102 sends the phone number to the wireless phone 114 via the wireless communications link and the number is dialed in step 518. Appendix B, below, includes an exemplary use case for placing a phone call where the control module 102 and wireless phone 114 are configured to communicate in accordance with the BLUETOOTH protocol.

Figure 6:
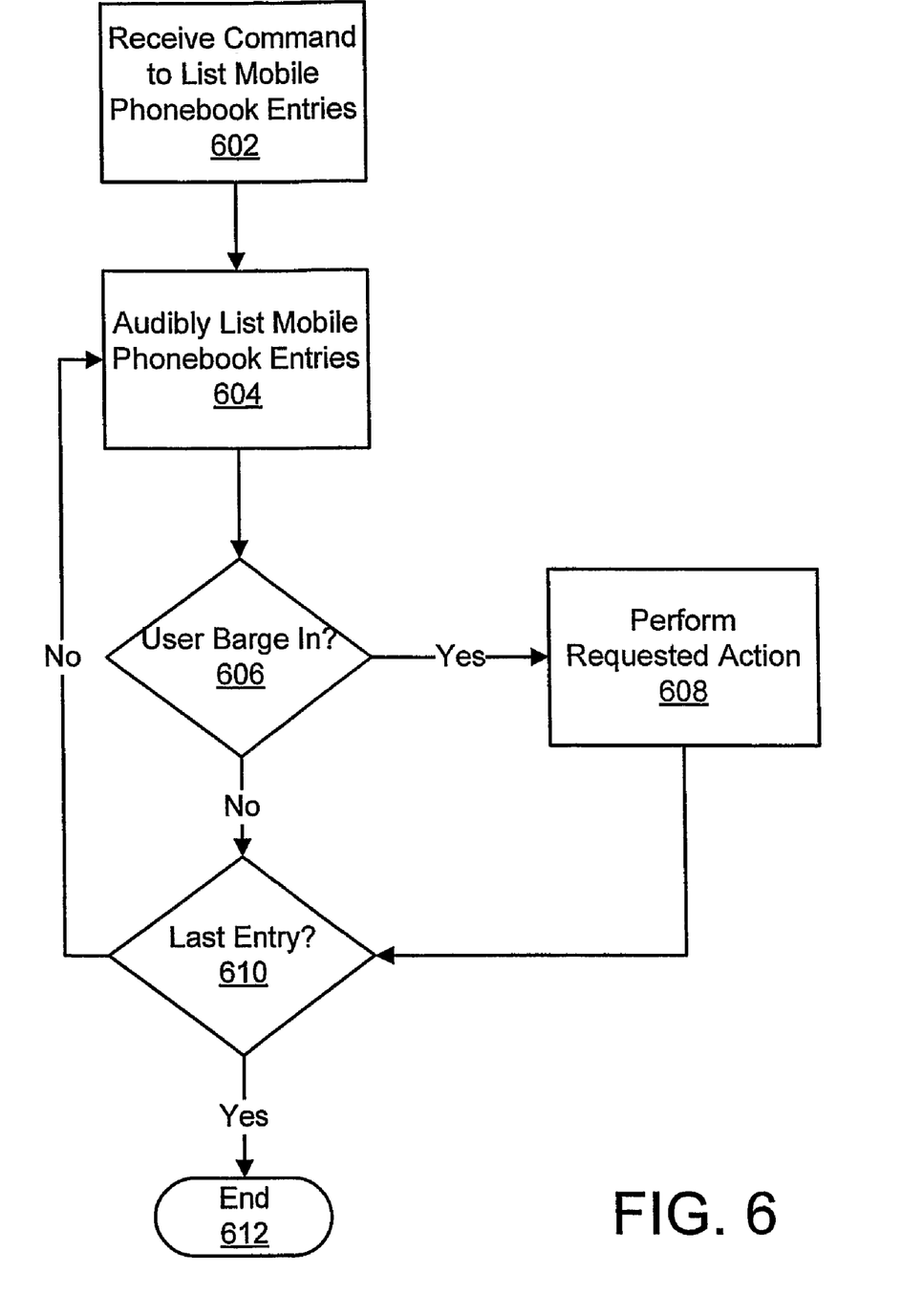
FIG. 6 illustrates a method for audibly listing phone entries of a mobile phonebook in accordance with an embodiment.

Control module 102 (FIG. 2) is also configured to provide a user with a listing of the mobile phonebook entries upon request. FIG. 6 illustrates a method for audibly listing phone entries of a mobile phonebook in accordance with an embodiment. At step 602, control module 102 receives a command from the user via a microphone 108 (FIG. 2) to list the contents of the mobile phonebook. In response to the command, control module 102 plays the text of each entry at step 604. The text (e.g., name text) of each entry is converted to an audio representation using text-to-speech engine 132 and the audio may be played in the vehicle using speakers 126 or audio system 104. Preferably, the text of the entries is displayed in alphanumeric order sorted character by character. A predetermined time period elapses between the playing of each entry. In addition, control module 102 is configured to allow the user to interrupt the audible listing of the phonebook entries by permitting the user to "barge-in." A user may barge in during the playing of an entry text or during a predetermined time after the playing of the entry in order to execute a command. If the user provides a command (i.e., barges in) at step 606, the control module 102 recognizes and performs the requested action at step 608. For example, a user may provide a command to skip to the next entry or to skip to an entry beginning at the next alphanumeric character. A user may also provide commands to select a desired entry once it is heard or to repeat a previous entry. If an entry is selected, a user may then, for example, initiate a call or transfer the entry to the system phonebook. When the last entry is reached (or when an entry is selected) at step 610, the process ends. If the last entry has not been reached, the process returns to step 604 and continues until either an entry is selected or the last entry in the mobile phonebook is reached. Appendix C, below, includes an exemplary use case for listing mobile phonebook entries where the control module 102 and wireless phone 114 are configured to communicate in accordance with the BLUETOOTH protocol.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with figures should not be construed as imposing on the invention any limitations that may be present in the figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

APPENDIX A

Example 1

| Feature | Remote Phonebook Access | | | | |
|---|---|---|---|---|---|
| Actors | Hands-Free Telephone System Control Module | BLUETOOTH | Microphone | Occupant | Mobile phone |
| | X | X | X | X | X |
| Description | Retrieve phonebook from phone. | | | | |
| Prior Conditions | BLUETOOTH Hands-Free Profile (HFP) service level connection established with phone. Hands-Free Telephone Mode = No Call In Progress. | | | | |
| Flow of Events | 1. | The user requests the Hands-Free Telephone Control Module to retrieve the phonebook contents from the currently selected phone. | | | |
| | 2. | The Hands-Free Telephone Control Module retrieves the contents. The Hands-Free Telephone Control Module ignores incoming call notifications while retrieving and processing the phonebook. The user may not originate calls while the Hands-Free Telephone Control Module is retrieving and processing the phonebook. | | | |

| | | |
|---|---|---|
| | 3. | The Hands-Free Telephone Control Module consolidates the phonebook entries, creates grammars for the entries, and places the entries in a temporary phonebook located in volatile memory. |
| Post Conditions | | BLUETOOTH HFP service level connection maintained with phone. Hands-Free Telephone Mode = No Call In Progress. |

Example 2

| Feature | Advanced Remote Phonebook Access | | | | |
|---|---|---|---|---|---|
| Actors | Hands-Free Telephone Control Module | BLUETOOTH | Microphone | Occupant | Mobile phone |
| | X | X | X | X | X |
| Description | Retrieve phonebook from phone. | | | | |
| Prior Conditions | BLUETOOTH HFP service level connection established with phone. Hands-Free Telephone Mode = No Call In Progress. | | | | |
| Flow of Events | 1. | The user requests the Hands-Free Telephone Control Module to retrieve the phonebook contents from the currently selected phone. | | | |
| | 2. | If a valid temporary phonebook already exists for the selected phone, the module notifies the user and requires the user to confirm the retrieval. | | | |
| | 3. | The Hands-Free Telephone Control Module retrieves the contents. | | | |
| | | a. | If the selected phone does not support PBAP, the Hands-Free Telephone Control Module retrieves the contents using the existing HFP service connection. Using the HFP service connection for this purpose is not required in the phone. If the phone does not support this operation, the Hands-Free Telephone Control Module notifies the user. | | |
| | | b. | If the selected phone does support PBAP, the Hands-Free Telephone Control Module drops the HFP connection and establishes the PBAP service connection with the phone. The Hands-Free Telephone Control Module retrieves the contents using the newly established PBAP connection. After retrieving the phonebook contents, the Hands-Free Telephone Control Module re-establishes the HFP connection. Alternatively, a concurrent profile connection is available such that more than one profile can be connected to a single wireless device (e.g., wireless phone, personal digital assistant, pager, etc.). For example, the wireless phone may be configured to establish a connection with the HFP and the PBAP, concurrently. Also, concurrent profile connections with multiple wireless devices are available such that multiple profiles can be connected to multiple wireless devices concurrently. For example, a wireless phone may be configured to establish a connection with the HFP, and a personal digital assistant may be configured to establish a connection using another profile, for example, Synchronization Profile (Sync) or Generic Object Exchange Profile (GOEP). Additionally, multiple concurrent profile connections with multiple wireless devices are available such that wireless phone 1 may establish a concurrent connection with the HFP and PBAP, while wireless phone 2 may establish a concurrent connection with the HFP and Sync. | | |
| | | c. | The Hands-Free Telephone Control Module determines and notifies the user of the approximate duration of the transfer. | | |
| | | d. | The Hands-Free Telephone Control Module ignores incoming call notifications while retrieving and processing the phonebook. | | |
| | | e. | The user may not originate calls while the Hands-Free Telephone Control Module is retrieving and processing the phonebook. | | |
| | 4. | The Hands-Free Telephone Control Module consolidates the phonebook entries, creates grammars for the entries, and places the entries in a temporary phonebook located in non-volatile memory. | | | |
| | | a. | The temporary phonebook is specific to the selected phone. | | |
| | | b. | The temporary phonebook supports at least 500 unique entries (name and number). | | |
| | | c. | The temporary phonebook may support more entries as available memory permits. | | |

|  |  |  |
|---|---|---|
| | d. | If available memory is insufficient to retain all the consolidated phonebook entries, the Hands-Free Telephone Control Module saves the first N entries (minimum of 500 entries). |
| | e. | For PBAP where a vCard may contain multiple numbers, the Hands-Free Telephone Control Module creates a unique grammar for each number consisting of the name and location. |
| Post Conditions | | BLUETOOTH HFP service level connection maintained with phone. Hands-Free Telephone Mode = No Call In Progress. Valid temporary phonebook for selected phone retained in non-volatile memory. |

APPENDIX B

Example 1

| Feature | Remote Phonebook Access | | | | |
|---|---|---|---|---|---|
| Actors | Hands-Free Telephone Control Module | BLUETOOTH | Microphone | Occupant | Mobile phone |
| | X | X | X | X | X |
| Description | Call <entry> from temporary phonebook. | | | | |
| Prior Conditions | BLUETOOTH HFP service level connection established with phone. Hands-Free Telephone Mode = No Call In Progress. | | | | |
| Flow of Events | 1. The user requests the Hands-Free Telephone Control Module to call a phonebook entry via voice tag. This will behave the same as it does for calling a number via voice tag from the persistent phonebook. | | | | |
| | 2. The Hands-Free Telephone Control Module recognizes the user utterance against the combined list of persistent and temporary phonebook entries and selects the best match. The HFM prompts the user to confirm the selection. | | | | |
| | 3. The user confirms the selection. | | | | |
| | 4. If necessary, the Hands-Free Telephone Control Module lists the numbers associated with the entry. (Location information for the number might not be available.) | | | | |
| | 5. The user selects and confirms the number. | | | | |
| | 6. The Hands-Free Telephone Control Module originates the call on the currently selected phone. | | | | |
| Post Conditions | BLUETOOTH HFP service level connection maintained with phone. Hands-Free Telephone Mode = Call In Progress. | | | | |

APPENDIX C

Example 1

| Feature | Remote Phonebook Access | | | | |
|---|---|---|---|---|---|
| Actors | Hands-Free Telephone Control Module | BLUETOOTH | Microphone | Occupant | Mobile phone |
| | X | X | X | X | X |
| Description | List entries in temporary phonebook. | | | | |
| Prior Conditions | Valid temporary phonebook. Hands-Free Telephone Mode = Call Not In Progress. | | | | |
| Flow of Events | 1. The user requests the Hands-Free Telephone Control Module to list the entries in the temporary phonebook. | | | | |
| | 2. The Hands-Free Telephone Control Module lists each entry in numeric-alphabetical order of the entry text using Text-to-Speech. | | | | |
| | 3. The user may barge in to select a particular entry similar to the List Names feature for the persistent phonebook except: | | | | |
| |     a. The Hands-Free Telephone Control Module will allow the user to transfer the entry to the persistent phonebook. | | | | |
| |     b. The Hands-Free Telephone Control Module will not allow the user to edit or delete the entry from the temporary phonebook. | | | | |
| Post Conditions | Possibility, Hands-Free Telephone Mode = Call In Progress, if "call" selected. | | | | |

What is claimed is:

1. A method for creating a phonebook for a hands-free telephone system in a vehicle using phonebook entries retrieved from a remote phonebook of a wireless phone over a wireless communication link between a control module of the hands-free telephone system and the wireless phone, the method comprising:
 receiving a remote phonebook from the wireless phone, the remote phonebook including a plurality of entries, each entry including text data, a location identifier, and numeric data;
 identifying the text data and the location identifier in each entry;
 consolidating entries with like text data and different location identifiers;
 generating an acoustic baseform for each entry based on the text data for each entry and the location identifier for each entry, wherein the acoustic baseform is configured to facilitate speech recognition of a spoken phrase comprising the text data and the location identifier, wherein the consolidation occurs prior to the generating step such that the generation of an acoustic baseform of the text data is not repeated for a single phonebook contact associated with multiple locations;
 storing the acoustic baseform for each entry in a baseform list; and
 storing the plurality of entries in a mobile phonebook associated with the baseform list.

2. A method according to claim 1, wherein the remote phonebook is received in response to a command by a user.

3. A method according to claim 2, further comprising receiving the command from the user via a user interface.

4. A method according to claim 2, wherein the command is a spoken command.

5. A method according to claim 1, further comprising:
 identifying duplicate entries in the plurality of entries in the mobile phonebook; and
 removing the duplicate entries.

6. A method according to claim 1, further comprising sorting the plurality of entries in the mobile phonebook.

7. A method according to claim 6, wherein the plurality of entries are sorted alphanumerically.

8. A method according to claim 1, wherein the mobile phonebook is stored in volatile memory.

9. A method according to claim 1, wherein the mobile phonebook is stored in non-volatile memory.

10. A method according to claim 1, wherein the acoustic baseforms are configured to allow each entry to be speech recognized.

11. A hands-free telephone system in a vehicle for retrieving phonebook entries from a wireless phone over a communication link, the system comprising:
 a communication module for establishing a wireless communication link with the wireless phone, the communication module being configured to receive a plurality of entries of a remote phonebook from the wireless phone, wherein each of the entries includes text data, a location identifier, and numeric data;
 a data processing module coupled to the communication module, the data processing module being configured to identify the text data of each entry and to identify the location identifier of each entry, wherein the data processing module is further configured to consolidate entries with like text data and different location identifiers;
 wherein the data processing module is further configured to generate a phonemic representation of the text data and location identifier of each entry, wherein the data processing module is configured to conduct the consolidation prior to the generating step such that the generation of an acoustic baseform of the text data is not repeated for a single phonebook contact associated with multiple locations; and
 a memory module configured to store the plurality of entries received from the remote phonebook and the phonemic representation of the text data of each of the plurality of entries.

12. A system according to claim 11, further comprising a user interface configured to receive input commands to facilitate the retrieval and manipulation of the phonebook entries retrieved from the wireless phone.

13. A system according to claim 11, further comprising an audio input device configured to receive oral input commands from a user.

14. A system according to claim 11, further comprising a speech recognition module configured to compare oral input commands received from a user to a predetermined set of input commands, wherein the speech recognition module determines an appropriate response based on the oral input command.

15. A system according to claim 11, further comprising a text conversion engine configured to convert text data of each phonebook entry to an audible speech representation of the text data.

16. A system according to claim 11, wherein the memory module comprises a volatile memory.

17. A system according to claim 11, wherein the memory module comprises a non-volatile memory.

18. A system according to claim 11, wherein the phonemic representation of each phonebook entry is configured to facilitate speech recognition of each phonebook entry.

19. A system according to claim 11, wherein the system is configured to sort the plurality of entries retrieved from the remote phonebook, such that the system consolidates entries in the plurality of phonebook entries.

20. A system according to claim 11, wherein the system is configured to identify and remove duplicate entries in the plurality of phonebook entries.

* * * * *